March 16, 1943.   D. B. STEINMAN   2,314,174
UNIVERSAL STEREO ATTACHMENT FOR PROJECTORS AND CAMERAS
Filed Dec. 14, 1940   4 Sheets-Sheet 1
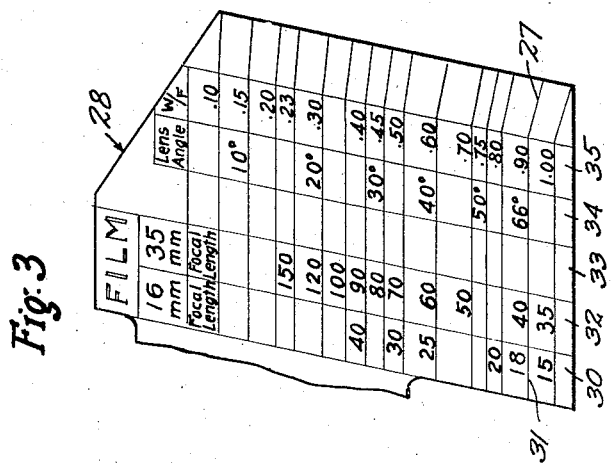
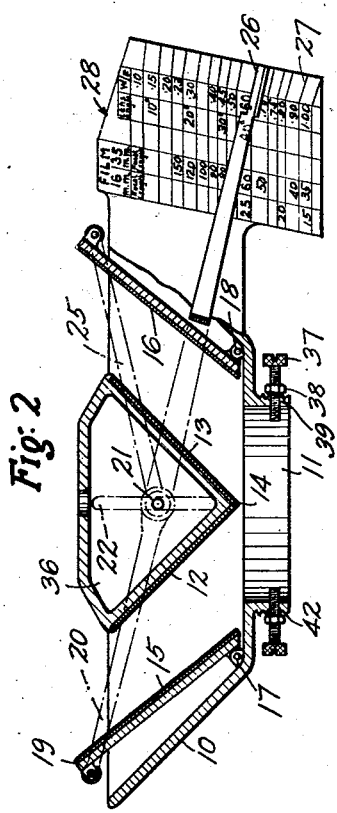
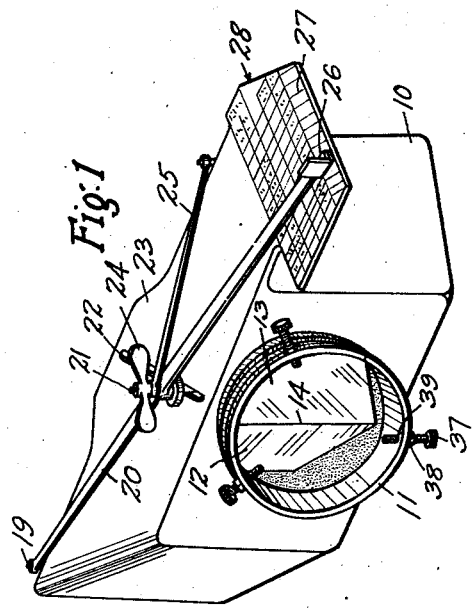
INVENTOR
David B. Steinman
BY
ATTORNEY March 16, 1943.  D. B. STEINMAN  2,314,174
UNIVERSAL STEREO ATTACHMENT FOR PROJECTORS AND CAMERAS
Filed Dec. 14, 1940  4 Sheets-Sheet 2

INVENTOR
David B. Steinman
BY
ATTORNEY

March 16, 1943.　　　D. B. STEINMAN　　　2,314,174
UNIVERSAL STEREO ATTACHMENT FOR PROJECTORS AND CAMERAS
Filed Dec. 14, 1940　　　4 Sheets-Sheet 3
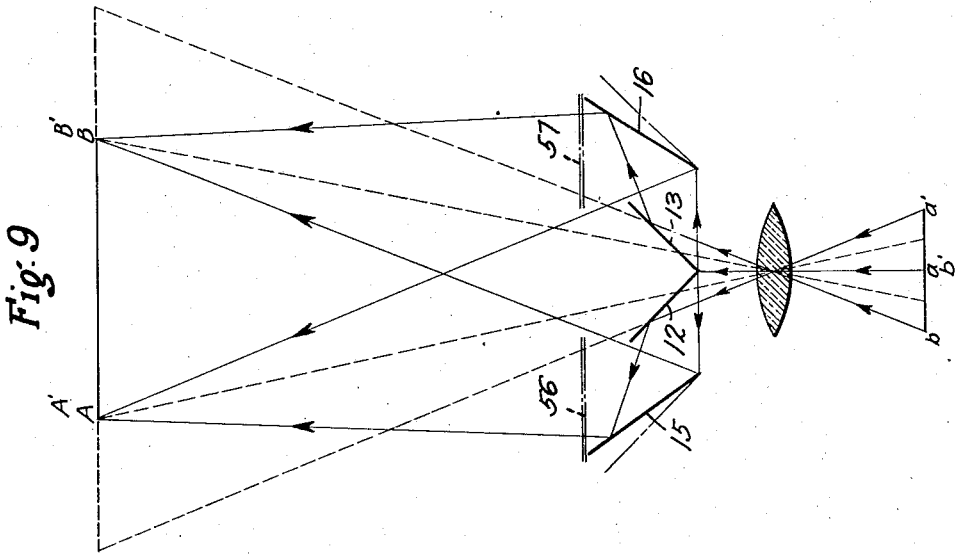
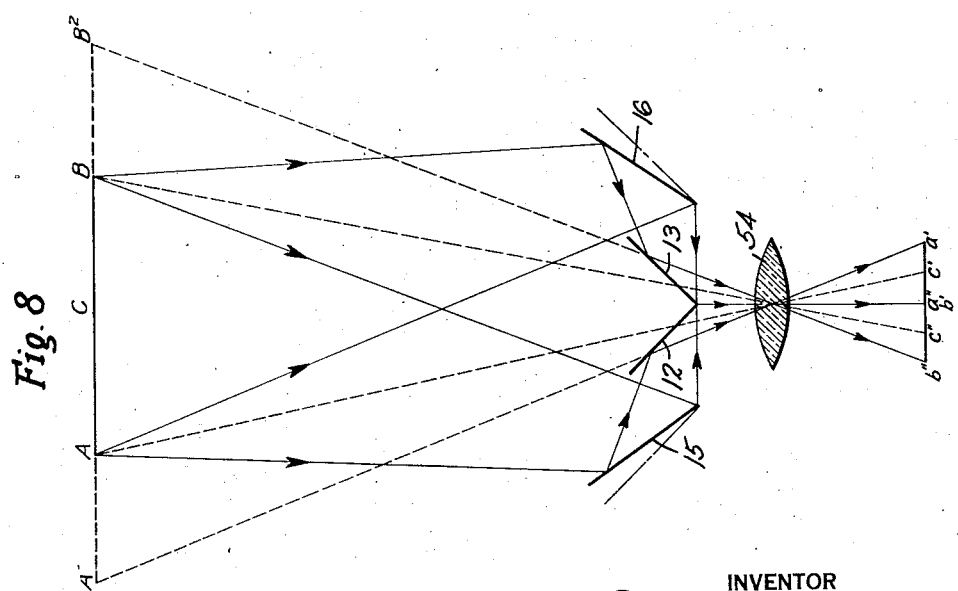
INVENTOR
David B. Steinman
BY
ATTORNEY March 16, 1943.     D. B. STEINMAN     2,314,174
UNIVERSAL STEREO ATTACHMENT FOR PROJECTORS AND CAMERAS
Filed Dec. 14, 1940     4 Sheets-Sheet 4
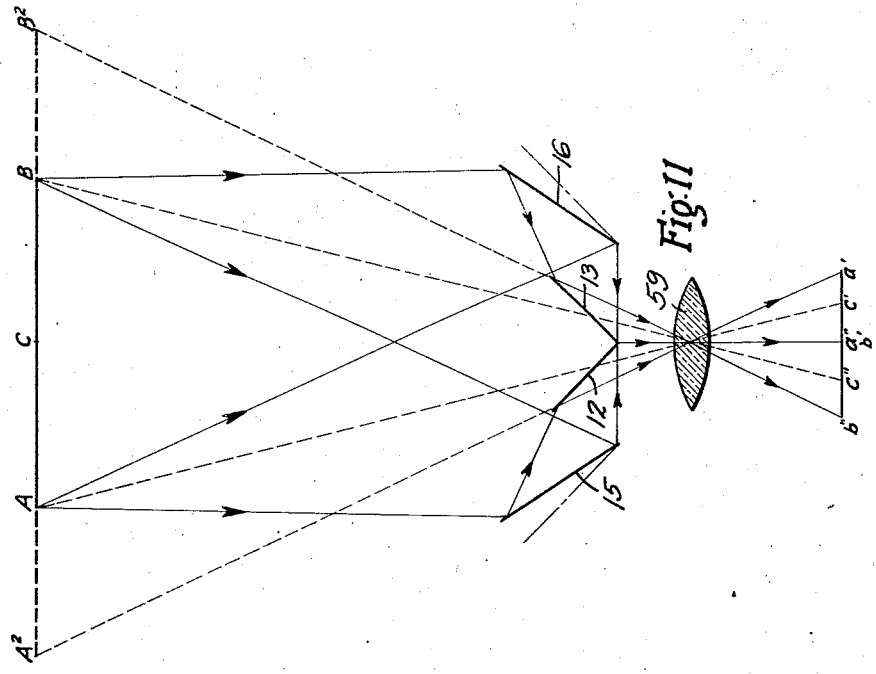
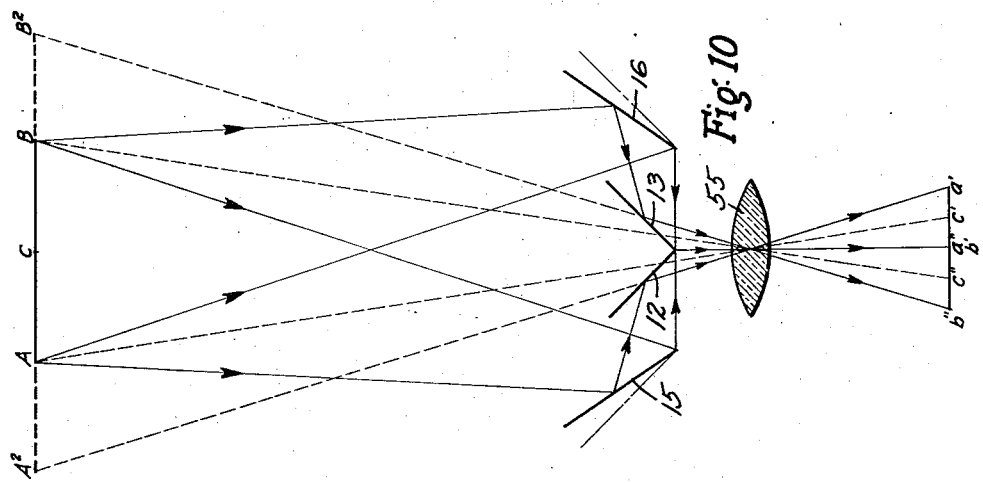
INVENTOR
David B. Steinman
BY
ATTORNEY Patented Mar. 16, 1943

2,314,174

UNITED STATES PATENT OFFICE 2,314,174

UNIVERSAL STEREO ATTACHMENT FOR PROJECTORS AND CAMERAS

David B. Steinman, New York, N. Y.

Application December 14, 1940, Serial No. 370,106

3 Claims. (Cl. 88—16.6)

This invention relates to stereo picture apparatus and particularly to those attachments designed to cooperate with the lens of a camera or of a projector for the purpose of making or projecting stereo or twin pictures, either of the motion picture type or of the still type and either multicolored or single tint or "black and white pictures."

To take the place of specially designed cameras, stereo attachments have been devised for use with ordinary cameras to produce twin pictures. Attachments have also been devised for use with standard projectors for the purpose of projecting the twin stereo pictures on a screen. The attachments for cameras and those for projectors have usually been of different constructions, though both generally involve paired optical systems comprising twin systems of reflectors or refractors. These systems produce the desired relative lateral displacement of the twin camera images on the plate or film, or of the twin projected images on the screen. With the reflectors or their equivalents set in fixed angular relation in each optical system, stereo attachments for cameras or projectors could not be used heretofore interchangeably with different cameras or projectors having lenses of different angle or different focal length. Nor could they be used to produce variable optional lateral displacement of the twin projected images on the screen or film.

In the camera, it is convenient to produce the twin stereo images in contiguous relation on the plate or film, that is, with the inner edge of one picture touching the non-corresponding edge of the other picture. Each picture or image thereby occupies one-half of the width of the total frame available for the picture. The lateral displacement of each image from the center of the frame is therefore substantially one-fourth of the total frame width available. The angle of lateral displacement of the rays producing each picture is consequently a function of the ratio of the focal length of the particular lens to the total width of the available frame or the total width of both twin pictures.

When projecting the twin pictures on a screen, it is commonly desired to use a single or standard projector and to bring the twin projected stereo images into coincidence on the screen, generally in conjunction with polarizing filters or colored filters. In this case also, the lateral displacement of each image to obtain coincidence is substantially one-fourth of the combined widths of the two images or equal to the initial lateral displacement of the center of each image from the vertical median line between the two images as they would appear when projected without lateral displacement. The angle of lateral displacement of the rays producing each image on the screen is in this case also a function of the ratio of the focal length of the particular lens of the projector to the total width of the twin pictures on the plate or film, or otherwise stated, the ratio of the screen distance to the total width of the image on the screen before lateral displacement.

In a system of projecting and viewing stereo pictures which dispenses with the use of polarizing filters or color filters, it is desirable to increase the relative lateral displacement of the twin stereo images on the screen or on two separate screens or in other words, to space the images in non-overlapping relation instead of bringing the twin images into coincidence. In this case also, the necessary angle of lateral displacement of the rays producing each image on the screen is a function of the ratio of the distance of the screen from the projector to the desired lateral displacement of each image. Such displacement of the rays may be accomplished by any suitable light deflectors, such as mirrors, reflectors, prisms, refracting prisms and lenses, or combinations thereof.

My invention therefore contemplates the provision of an attachment designed to be removably arranged to deflect or displace the rays from an object to a sensitized surface, or from a pair of pictures to a viewing screen by the required amount to space the required images as desired and to compensate for differences in the lenses used.

My invention further contemplates the provision of an adjustable stereo attachment which is of universal application and capable of use with any camera, as well as being capable of use also with any projector regardless of the difference in the focal lengths or angles of the lenses in such cameras or projectors and regardless of the particular system of stereo projection used and also regardless of the particular system used by the audience in viewing the projected picture.

My invention also contemplates the provision of a simple and comparatively inexpensive stereo attachment for cameras and projectors designed to space the images on the film of a camera exactly as desired regardless of the distance of the object from the camera and also adjustable to space the projected images of the picture of the film on a viewing screen as far apart or as close together as is found desirable.

My invention further contemplates the provision of a light deflector system in a camera or projector attachment employing reflectors, at least two of the reflectors of the system being adjustable and the adjustment serving a two fold purpose; namely, first when the adjustable reflectors are used in an attachment for a camera, to space the film images in contiguous or laterally spaced relation regardless of the focal length of the lens of the camera, or of the lens angle of the lens and regardless of the width of the desired picture; and second, when used in an attachment for a projector to permit the use of the standard projector in connection with the attachment regardless of the focal lengths and lens angle of the lens or the distance of the screen from the projector or of the width of the images or the amount of separation of the twin pictures, or whether the two images are overlapped or made to coincide to permit the viewing thereof by polarizing filters or color filters.

The various objects of the invention will be clear from the description which follows and from the drawings, in which, Fig. 1 is a perspective view of a preferred form of my attachment.

Fig. 2 is a horizontal section of the same with the top partly broken away to show the interior structure, the adjusting levers and the guide slot being shown in dash-dot lines as though not removed.

Fig. 3 is a representation of the scale, table or indicating means on the top of the attachment and intended for use in connection with the adjusting levers to indicate the setting thereof.

Fig. 8 is an optical diagram showing the path of the deflected rays when the attachment is used in connection with a camera to take stereo pictures.

Fig. 9 is a similar diagram showing the path of the deflected rays when the attachment is used with a projector to project pictures in coincident relation and also showing the use of filters such as polarizing or color filters.

Fig. 10 is an optical diagram similar to Fig. 8 but showing a lens of different focal length from that shown in Fig. 8.

Fig. 11 is a view similar to Figs. 8 and 10 but showing a lens of a different lens angle and used in connection with a pair of pictures of different width from those shown in Figs. 8 and 10.

Figure 4:
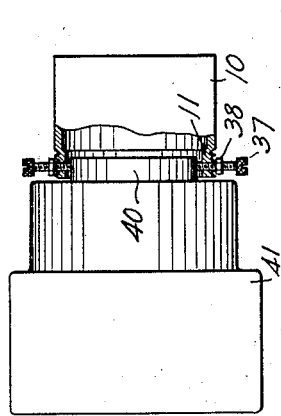
Fig. 4 is a side view and partial section of a camera or projector showing one form of the means for securing the attachment thereto.

Referring now to Figs. 1 and 2 illustrating a practical embodiment of the invention, the casing 10 is provided with a hollow cylindrical attachment ring 11 having an opening therein communicating with the interior of the casing. Various forms of means, later to be described, may be employed for securing the ring to a camera or to a projector. Arranged in the casing are a pair of fixed mirrors 12 and 13 meeting at 14 centrally of the opening in the ring 11. Preferably, the mirrors are of the front-surfaced type though it will be understood that reflecting prisms may be used instead of mirrors as will be obvious and hence needs no illustration. It will also be understood that refracting prisms, lenses or other light deflectors may be used to change the directions of the light rays as is well understood in the art. Adjacent the side walls of the casing are light deflectors, here shown in the form of front-surfaced mirrors 15 and 16.

Said mirrors are pivoted to the casing or to suitable bearings carried thereby as at 17 and 18 respectively adjacent the respective rear edges thereof. The front end edge portion 19 of the mirror 15 or its support is pivotally secured to the left end of the lever 20. Said lever is pivotally mounted intermediate its ends on the screw 21 slidable in the slot 22 in the top 23 of the casing. The head of the screw 21 is arranged in the interior of the casing while on its upper end is mounted the wing nut 24 by means of which the lever 20 may be clamped in place at any selected point of the slot. Also mounted on the screw 21 is the shorter toggle lever 25 which is pivoted at its front end to the front edge of the mirror 16.

It will be seen that on loosening the wing nut 24, the screw 21 is shiftable in its slot thereby operating the levers 20 and 25 to swing the mirrors 15 and 16 upon their respective pivots 17 and 18 in opposite directions simultaneously and through approximately the same angles. At the same time the extended and magnifying indicating end 26 of the lever 20 moves over the markings or graduations 27 on the top 23, which indicate the proper positon of the lever 20 in accordance with the table 28. After the lever has been adjusted to coincide with the proper selected indicating or graduation line 27 to render the attachment operable with the selected film and with the particular lens of the camera or projector, then the nut 24 is tightened and the parts clamped in their thus adjusted positions.

As will be seen from Fig. 3, the selection of the proper line 27 of the table 28 and the setting of the edge 26 of the lever 20 on the selected line, determines the setting of the movable mirror for the particular film and lens. The column 30 of the table (Fig. 3) comprises indications for a selected size of film, namely, sixteen millimeter film, and gives the settings for camera or projection lenses of different focal lengths ranging as shown from fifteen to forty millimeters. The horizontal line as 31 below the figure for the focal length of the selected lens (say one for a focal length of 18 mm.), and for sixteen millimeter film leads to the sub-division 27 of the indicating scale to which the edge 26 of the lever 20 is set to give proper adjustment of the mirrors.

Similarly, for thirty-five millimeter film, the scale 32 gives the settings for camera or projection lenses of focal lengths from thirty-five to one hundred and fifty millimeters. In the next column 33 (shown blank) may be arranged similar scales for other widths of film in still or motion picture cameras or projectors. In column 34 may be given a scale for any width of film or picture giving the required settings for lenses of different lens angles. In column 35 is arranged a general scale giving the settings for different ratios of film width W to focal length of lens F.

which as has been explained is the same as the ratio of projected screen picture or image width before displacement to the distance of the projector from the screen.

If desired, the indications 27 may be a set of arbitrary graduations for use with accompanying tables or charts giving the proper settings for different lenses in different cameras. Other ways in which the table or scales may be modified will be obvious. If desired, the markings 27 may be determined by computation from the constants of the device (as by dividing the figure giving the size of the film picture frame by the figure giving the focal length of the lens, that is $W/F$) or they may be calculated by trial of the attachment with a series of cameras or projectors. The angle between the movable reflector and the fixed reflector in each optical system and determined by the setting of the lever 20 or the selected indication 27 is approximately one-eighth of the angle of the lens, since the angular displacement of a reflected light ray is twice the angular displacement of the reflector.

The mean or average distance between the pivoted reflectors 15 and 16 is made approximately equal to the average interpupillary distance, that is about two and one-half inches. This mean distance may be made larger, however, if an exaggerated stereo effect, commonly called hyperstereo, is desired.

The compartment 36 between the fixed mirrors 12 and 13 may be used as a view-finder if desired and suitable optical parts arranged therein. Since the field of view for a camera employing my stereo attachment has its height undiminished, but its width reduced to the middle half of what the original field of view would be without the attachment, the camera view-finder may have its outer quarters of width marked or masked to guide the user, or any suitable adjustable view-finder may be employed with the attachment or incorporated in the compartment 36.

Figure 5:
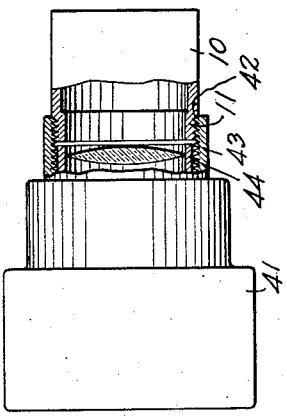
Fig. 5 is a similar view of a modified form of the means for securing the attachment to a camera or projector and comprising a threaded adaptor ring.

The means illustrated for detachably securing the attachment to the lens barrel of a conventional or standard projector will now be described. As shown in Figs. 1, 2 and 4, the ring 11 may be provided with spaced set screws as 37 each held in adjusted position by a suitable lock nut 38, and each of the set screws passing through a suitable threaded opening 39 in the ring 11. Said screws may therefore be rotated into engagement with the lens barrel 40 of different cameras or projectors 41 though the lens barrels may differ considerably in diameter. By tightening the nuts 38, the attachment may be held removably to the camera or projector for cooperation with the lens thereof to displace the images of the object or pictures as required. In the form of the attaching means shown in Fig. 5, the ring 11 is externally threaded as at 42 and the standard adapter ring 43 used to connect the attachment to the lens barrel 44. It will be understood that the threads on one part of the adapter 43 are of the proper diameter and are designed to fit the threads 42. The diameter of the other part of the adapter is the same as that of the lens barrel to fit on to said barrel.

Figure 6:
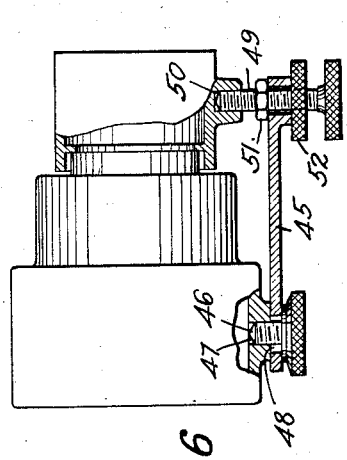
Fig. 6 is a similar view of another modified form of the means for supporting the attachment and consisting of a bracket engaging the tripod socket of the camera.

In that form of the invention shown in Fig. 6, a bracket or arm 45 is provided, adapted to be removably secured to the internally threaded tripod socket of the camera and also to a similar socket provided on the base of the attachment. In this case, the screw 46 enters the threaded tripod socket 47 on the camera and is adjustable in the opening 48, the camera being held in place to the bracket 45 by the head of the screw 46 on the tightening of said screw. At the other end of the bracket is provided the screw 49 entering the threaded socket 50 of the attachment. Said screw is held in adjusted position to the bracket 45 by means of the adjustable lock nuts 51 and 52. It will be understood that any other suitable means commonly used for holding attachments in place may be used to hold the stereo attachment to the optical instrument with which it is to be used.

Figs. 8, 10 and 11 are optical diagrams showing the paths of the rays of light from the object to the picture film or other sensitized surface of the camera, and showing the formation from the object AB of the picture images $a'b'$ and $a''b''$ on the plate or film in contiguous relation, that is, with the edge $b'$ of one picture coincident with the non-corresponding edge $a''$ of the other picture. The arrows on the rays show the directions thereof and how they are displaced to form the projected overlapped or coincident twin stereo images. It will be noted that the displacing of the central point C of the object to the right and left at the points $c'$ and $c''$ on the film deviate from the undeflected position of the central point on the film by one-quarter of the total width of both picture images $a'b'$ and $a''b''$. However, if it is desired to separate the picture $a'b'$ from the picture $a''b''$, this can readily be done by swinging the movable mirrors 15, 16 to the dash-dot line positions thereof shown in Fig. 8. The normal field of view of the camera without the use of my attachment would be from $A^2$ to $B^2$ which is approximately twice the restricted field of view afforded when the stereo attachment is used with the camera.

It will be noted from Fig. 10 that with a lens 55 differing in focal length from the lens 54 of Fig. 8, a picture of the same size as that of Fig. 8 may be obtained by merely adjusting the reflectors 15 and 16 according to the selected indication 27 of the scale or table 28.

In Fig. 11, the lens 59 differs from the lenses 54 and 55, in that it has a different lens angle. This diagram also differs from Figs. 8 and 10 by reason of the differences in picture width thereof. Adjustment of the movable reflectors of the attachment, however, make it possible to produce the required stereo pictures regardless of the differences in the lens angles and the picture widths.

In Fig. 9, I have shown the arrows on the various rays reversed to show that the pictures $a'b'$ and $ab$ on the film are projected on to the screen in coincident relation as the projected images AB and A'B'. The projection and viewing system for colored pictures wherein the colored images on the screen are brought into coincidence, necessitates the use of the properties of polarized light and therefore the polarizing filters 56, 57 may be added to the stereo attachment. If desired, however, they may be placed in front of or behind the picture on the slide or film, or such filters may be arranged both in front of and behind the picture. It will be remembered, however, that in viewing the coincident pictures on the screen, the viewing position of the observer is limited, and in addition light polarizing spectacles or filters must be used by the observer to eliminate one of the coincident images from view by one eye and to eliminate the other one from view by the other eye.

What has been said in connection with polarizing filters is equally true with respect to color filters which are used for black and white or monochromatic stereo pictures. In other words, the filters 56, 57 may be color filters to project differently tinted images into coincident relation upon the screen. The observer uses corresponding color spectacles or filters one for each eye to eliminate the unwanted picture.

Figure 7:
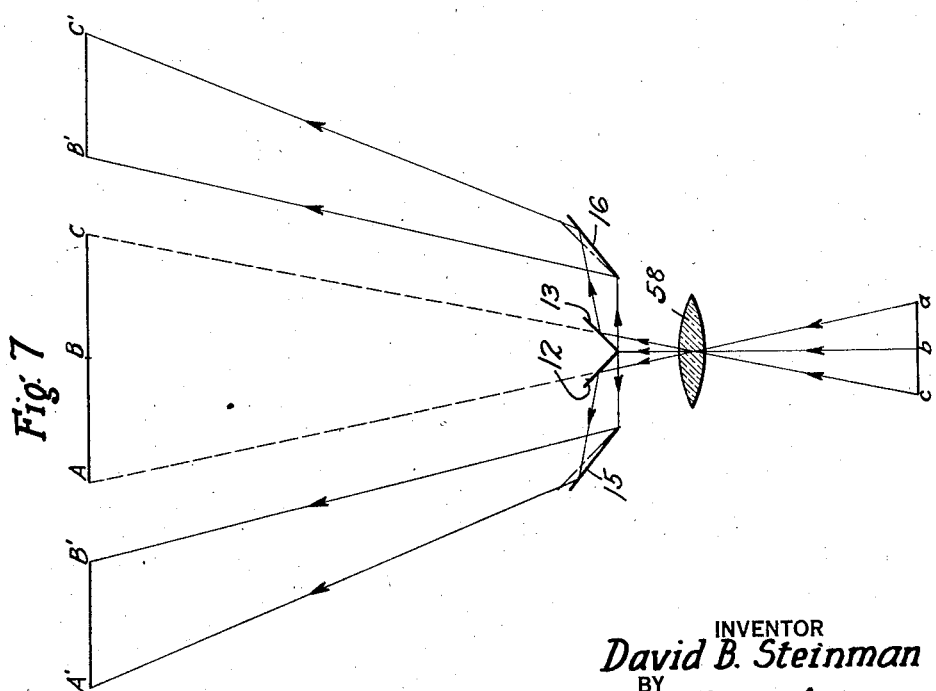
Fig. 7 is an optical diagram showing the paths of the rays as deflected when a pair of stereo pictures is projected on a screen in widely spaced relation by means of my attachment and a standard projector.

In projection systems employing images on the screen brought into coincidence, the picture may be limited to the coinciding stereo images by limiting the size of the screen, by black or opaque masking of the lateral borders of the screen, by slotted screens or masks in front of the projector or attachment in a manner which will be readily understood, or by polarizing cancellation of unwanted images or by any other suitable means known to those skilled in the art. In such systems of projection, special viewers must be employed by the audience to obtain the desired stereoscopic effect and the projected pictures cannot be properly seen without the aid of such viewers.

Where such filters are not used, the projection system shown in Fig. 7 may be employed. In this system, the stereo pictures *ab* and *bc* are projected into lateral spaced relation on to the viewing surface by means of my attachment into the positions A'B' and B'C'. The images AB and BC indicate the positions which the pictures would take if the attachment were not used. The thus spaced images may easily be viewed by mechanical means forming the subject matter of my copending application for patent for Stereo motion picture viewer filed December 12, 1940, Serial No. 369,770 and to which reference is hereby made. This system has the advantages that the pictures may be viewed by an audience distributed in any manner without the necessity for using polarizing or color filters, and may also be viewed as flat or non-stereo pictures by those not using special viewers or having eye or other defects which make stereopsis difficult or impossible.

It will be understood that hereinabove where I have referred to mirrors or reflectors, any other type of light deflecting means may be employed and that while I have shown and described a particular mechanism for adjusting the light deflectors, any other equivalent mechanism may be substituted, without departing from the spirit of the invention. It will further be seen that I have provided an attachment capable of use either with a projector or a camera and adapted for use with various sizes of film and various lenses having a wide range of focal lengths and lens angles, by a simple adjustment thereof in accordance with indicating means provided for that purpose and that consequently, I have provided a universal device capable of a wide range of use and well designed to meet the conditions found in practice.

While I have shown and described certain specific embodiments of my invention, I do not wish to be understood as limiting myself thereto, but intend to claim my invention as broadly as may be permitted by the state of the prior art and the scope of the appended claims.

I claim:

1. A universal stereo attachment usable with different optical instruments having different ratios of the focal lengths of the lenses thereof to the total widths of the twin stereo pictures associated therewith, said attachment comprising a casing having a rear opening and a pair of spaced front openings, two pairs of reflectors, each pair being arranged between one of the front openings and the rear opening, one reflector of each pair being pivoted at its rear end to the casing, a lever pivoted to the front end of each movable reflector, a common movable pivot for the inner adjacent ends of the levers, said casing having a slot into which said pivot is inserted, means for clamping the pivot at any selected point of said slot to clamp the movable reflectors in any selected adjusted position thereof, an extension on one of the levers and a series of graduations carried by the casing and indicating the correct positions of said extension for such adjustments of the movable reflectors as correspond to the ratios hereinbefore mentioned.

2. A universal stereo attachment usable with different optical instruments having different ratios of the focal lengths of the lenses thereof to the total widths of the twin stereo pictures associated therewith, said attachment comprising a slotted casing, a set of reflectors within the casing for displacing the image of each stereo picture, one reflector of each set being movable, and means for varying the angular relation of said movable reflectors comprising a pair of toggle levers pivoted at their outer ends to said movable reflectors, the inner end of one of the levers overlapping the other, a common pivot at the inner end for both levers, said pivot passing through the slot of the casing, and means for clamping the pivot in adjusted position in the slot.

3. A stereo attachment for a standard camera comprising a casing having front and rear openings, a pair of optical deflector units in the casing between the openings, means including a pair of toggle levers having a common adjustable pivot, one of said levers extending past the casing and forming a pointer, said means coupling the units together to adjust said units simultaneously and symmetrically in opposite directions, and a table carried by the casing and including graduations selected by the pointer and identifying designations for the graduations to indicate the adjusted positions of said units for various ratios of focal lengths of different lenses applied to the camera to film widths independently of the visibility of the images produced by the camera.

DAVID B. STEINMAN.